April 25, 1944.    A. KELLER    2,347,563
DEVICE FOR COMPENSATING THE TEMPERATURE OF SYSTEMS FOR
DISTANT MEASUREMENT OF THE NUMBER OF REVOLUTIONS
Filed Oct. 23, 1940    2 Sheets-Sheet 1
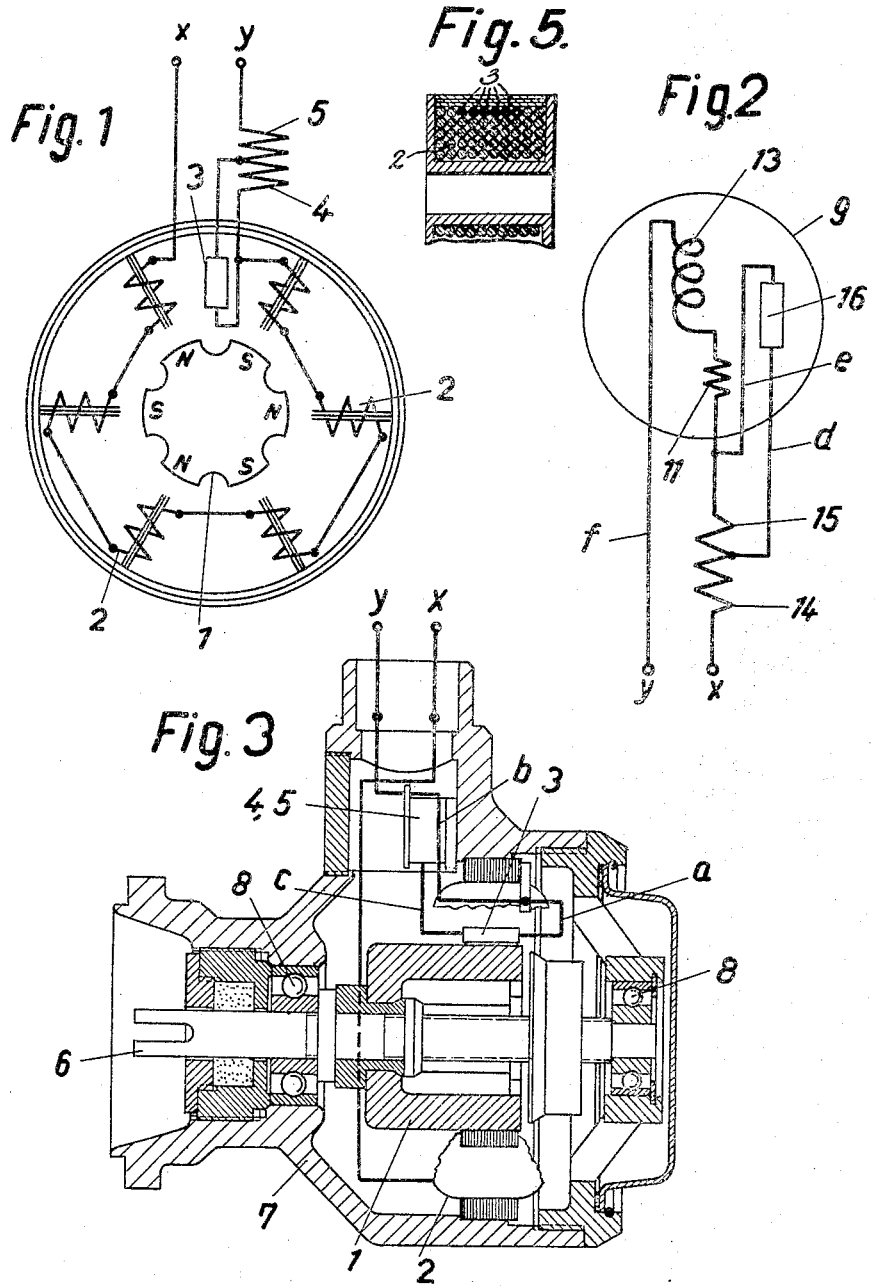
INVENTOR
ARNOLD KELLER
BY
HIS ATTORNEY

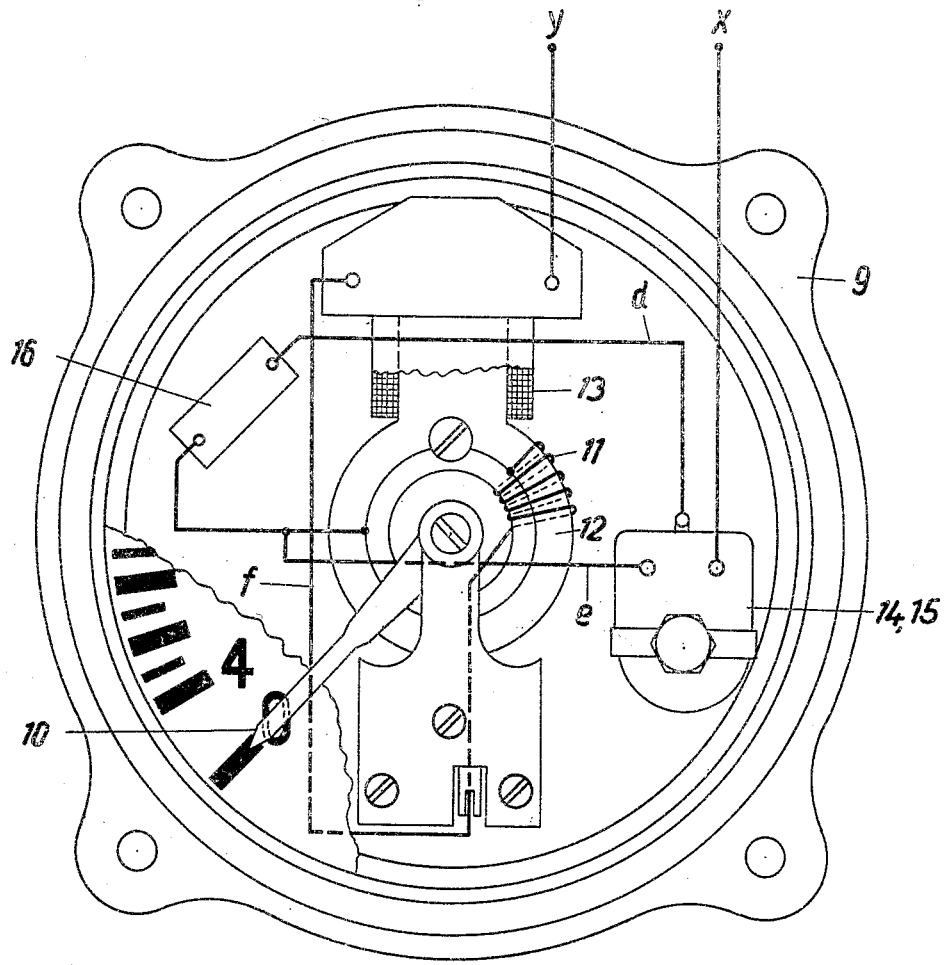

Patented Apr. 25, 1944

2,347,563

UNITED STATES PATENT OFFICE 2,347,563

DEVICE FOR COMPENSATING THE TEMPERATURE OF SYSTEMS FOR DISTANT MEASUREMENT OF THE NUMBER OF REVOLUTIONS

Arnold Keller, Berlin-Wilmersdorf, Germany; vested in the Alien Property Custodian Application October 23, 1940, Serial No. 362,402
In Germany September 15, 1939

1 Claim. (Cl. 171—229)

The systems for measuring the number of revolutions treated hereinafter are operated by driving a dynamo (the transmitter) with the number of revolutions to be measured and by measuring at the receiving station the voltage generated by the dynamo, mostly by means of a direct current instrument via rectifiers or by means of an electrodynamic measuring instrument.

At higher temperatures of the transmitter the indication obtained in this way is reduced for two reasons: firstly, owing to the rising resistance of the windings in the transmitter, and furthermore owing to the reduction of the strength of the magnet, as shown by every magnet. The first mentioned influence is in most cases considerably greater than the latter. The copper resistance varies by 4% for each 10 degrees centigrade, and the error caused thereby depends upon the proportion of this resistance variation to the total ohm resistance of the circuit. In order to make it small, it would be necessary to use a very high constant series resistance. Since the current consumption of the indicating instrument is not optionally variable, it would be necessary to make the transmitter very strong and, therefore, large and heavy, which is mostly undesirable. The temperature variation of the magnetic flux is of the order of 0.3% for each 10 degrees centigrade, but in many cases the actually occurring error of indication, especially with large numbers of revolutions, is even of a higher order than that mentioned.

In most of the systems for distant measurement of the number of revolutions the temperature compensation of the transmitter is effected by varying the strength of the magnet in dependence on the temperature by magnetic shunt connection of a ring or the like consisting of an iron-nickel alloy. With increasing temperatures, a smaller number of lines of force will be short-circuited via the iron-nickel body so that the induced voltage will rise.

This method, i. e. use of the shunt, has two considerable disadvantages: (1) the reproduction of a certain course of the temperature is exceedingly difficult even with small magnetic unhomogeneities of the material or with a somewhat heterogeneous magnetization, and (2) by this way of compensating the variations due to the temperature, a systematic curve error arises at higher temperatures. With a limited current loading of the transmitter by the indicating instrument, a variation of the magnetic flux will have a comparatively greater effect upon the indication of the number of revolutions, if the number of revolutions is higher than if it is lower, because the current intensity is not proportional to the number of revolutions, but rises more slowly with greater numbers of revolutions. As a variation of the resistance of the transmitter owing to the rising temperature causes the same relative variation of the indication of the number of revolutions for all values of the number of revolutions, the result of this is that a transmitter, which is correctly compensated for average speeds, will be over-adjusted for higher speeds and under-adjusted for lower speeds.

Apparently, the most natural way of compensation would be to insert a series resistance decreasing with increasing temperature in such a way that the error due to the temperature is compensated. However, the existing resistances of this kind either have a very large or a very small negative temperature coefficient of the electric resistance. Bodies with very large temperature coefficients are many temperature-dependent conductors, especially metal oxides. Their temperature coefficients amount to a few per cent for each degree centigrade. Consequently, the absolute variation of these resistances is considerably greater for lower temperatures than for higher temperatures. For example, the resistance of cuprous oxide resistances is reduced to one-half by a rise in temperature of 30 degrees centigrade, so that the differential variation of their resistance at, for example, 50° C. will still amount to about one-half of that at 20° C. On the other hand, the output of the transmitter will mostly not be sufficient to permit a sufficiently high series resistance for the compensation of temperature by means of series resistances with small negative temperature coefficients. Such resistances, for example certain kinds of carbon, have a temperature coefficient of a few tenths of a per cent for a temperature variation of 10° C. Since the temperature coefficient of copper is four per cent for 10° C., the order in the case of the series resistance would have to be ten times as large as that of the copper resistance, so that the transmitters would have to be extremely large and heavy.

According to the invention, it is possible to obtain a compensation of temperature with comparatively small series resistances, using resistances with very large temperature coefficients, by providing a series resistance in which a highly temperature-dependent conductor 3, is connected in parallel with a resistance 4, varying but slightly with the temperature. By correctly dimensioning the resistances 3, 4, it is possible to obtain a practically completely linear dependence of the resistance upon the temperature. If necessary, there may also be inserted in the system a small temperature-dependent series resistance 5, in order to obtain a more improved linearity. A still more improved linear or, if necessary, not linear dependence upon the temperature may be obtained by inserting (mixed series and parallel connection) additional highly or slightly temperature-dependent resistances 3, 4 respectively (not shown) so as to form a network. With this arrangement, it is generally possible to obtain a practically completely sufficient linear compensation of temperature with a series resistance 5, which, in total, at the lowest temperature occurring, is about double the amount by which it must be reduced when the temperature rises.

As, apart from the influence of the copper resistance 2, also the magnet 1, in the transmitter (Figs. 1 and 3) causes a reduction in the indication at higher temperatures (variation of the remanence by about $-0.3\%$ for $10°$ C.) it is necessary, if an iron-nickel shunt (not shown) is to be altogether avoided, to cause a certain additional linear reduction of the total resistance, which compensates the temperature coefficient of the magnet 1. It should amount to about $0.3\%$ for each $10°$ C. The result of this is that an irregularity of the temperature compensation is caused for different numbers of revolutions, being in the reverse order as in compensating the influence of the copper resistance 2, by means of magnetic shunt (see above) and generally to a considerably smaller amount. Therefore, the transmitter is now still under-compensated for large numbers of revolutions and over-compensated for small numbers of revolutions, if it is correctly compensated for average numbers of revolutions. This still remaining error may be compensated according to the invention by the self-heating of the temperature-dependent conductor 3, as the current passes through. By a suitable heat insulation of the temperature-dependent conductor 3, this compensating effect may be dimensioned so as to obtain a practically complete compensation of the error due to the temperature at different numbers of revolutions.

In order also to obtain a correct indication in locally not uniform temperatures of the transmitter, it is advisable to mount the temperature-dependent conductor 3, as near as possible to the copper coils 2, of the transmitter, for example to insert it between two coils as shown in Fig. 1, or to wind it into one of the coils. The above mentioned optimum heat insulation may in this case be effected by providing the resistance beforehand with a heat-insulating cover (not shown). If the heat insulation is too high, this may be relieved by providing two resistances of equal size or one resistance of larger dimensions which will then, of course, be less self-heating.

As, furthermore, not only the transmitter, Figs. 1 and 3, but also the indicating instrument, Figs 2 and 4, is influenced by the temperature, frequently in another way than the transmitter, there may also be provided compensation of temperature in the indicating instrument in the manner described above in order to avoid errors caused thereby. All considerations mentioned above also apply in this case.

A constructional example of the object of the invention is illustrated diagrammatically in the accompanying drawings, in which:

Figs. 1 and 2 show circuit diagrams of the transmitter (Fig. 1) and of the indicating instrument (Fig. 2).

Fig. 3 is an axial section through the transmitter.

Fig. 4 is an interior view of the indicating instrument, and

Fig. 5 is a detail view showing the compensating resistance positioned inside the insulating taping of the dynamoelectric coil windings.

In Figs. 1 and 3 of the drawings, 1 designates the revolving magnet, 2 the individual coils, 3 the temperature-dependent resistance, 4 the temperature-independent resistance connected in parallel, and 5 the series resistance.

According to Fig. 3, the magnet 1 is fixed to the shaft 6 which is driven in a suitable manner from the shaft whose number of revolutions is to be determined. The magnet is rotatably mounted with ball bearings 8 in the housing 7.

The coils 2 are influenced in known manner. The one end of the coils is connected to the line $x$, whereas the other end of the coils is connected on the one hand to the temperature-dependent resistance 3 (connection $a$) and on the other hand to the temperature-independent parallel resistance 4 (line $b$). The temperature-dependent resistance 3 is connected via the line $c$ to the parallel resistance 4. The series resistance 5 is connected to the line $y$. From the lines $x$ and $y$ the current generated by the transmitter may be derived and conducted to the measuring instrument as shown in Figs. 2 and 4. The measuring instrument includes a housing 9. In the housing there is pivoted a pointer 10 which is provided with the moving coil 11. The moving coil 11 moves over the pole of an iron core 12 upon which is wound a field coil 13. Furthermore, there are arranged in the housing the series resistance 14 and the temperature-independent parallel resistance 15. The number 16 designates the temperature-dependent resistance. These individual parts are connected in such a manner that the current is conducted from the line $x$ to one end of the series resistance 14. The resistance 15 arranged behind the series resistance is connected in parallel with the temperature-dependent resistance 16 via the lines $d$ and $e$. The coil 11 and the field coil 13 are connected in series and have a connection via the line $f$ with the line $y$.

What is claimed is:

In an electrical generating and transmitting system having means for compensating for temperature variations, a dynamoelectric machine having a magnetic circuit of magnetic material and tape insulated conductive windings, a transmission circuit in series with said windings, two resistances in series with said circuit and windings and in parallel with one another, one of said resistances having a high negative temperature coefficient and being located within the insulating taping of the windings and the other resistance having a low temperature coefficient.

ARNOLD KELLER.